United States Patent [19]

Yoshio

[11] Patent Number: 5,097,459
[45] Date of Patent: Mar. 17, 1992

[54] DISC PLAYING APPARATUS TO WHICH DIGITAL DATA IS TRANSMITTED AT A PREDETERMINED TRANSMISSION RATE

[75] Inventor: Junichi Yoshio, Tokorozawa, Japan

[73] Assignee: Pioneer Electronic Corporation, Tokyo, Japan

[21] Appl. No.: 431,839

[22] Filed: Nov. 6, 1989

[30] Foreign Application Priority Data

Feb. 20, 1989 [JP] Japan ................................. 1-41365

[51] Int. Cl.⁵ ............................................. G11B 7/00
[52] U.S. Cl. ...................................... 369/48; 369/32; 369/59; 369/43
[58] Field of Search ................... 369/32, 33, 44.11, 47, 369/48, 59, 41, 43, 57

[56] References Cited

U.S. PATENT DOCUMENTS 4,994,925  2/1991  Yamashita et al. .................. 358/343

Primary Examiner—Roy N. Envall, Jr.
Assistant Examiner—Nabil Hinchi
Attorney, Agent, or Firm—Wegner, Cantor, Mueller & Player

[57] ABSTRACT

A disc playing apparatus allows to set the reproduction speed of subcode information at a designated speed. The subcode read-out by a reading device is decoded by a decoding device and each piece of digital data successively output from the decoding device is transmitted at a predetermined transmission rate. The interval between pieces of the digital data is varied in response to a designated reproduction speed, and at the same time each piece of the digital data is transmitted at the predetermined transmission rate.

3 Claims, 6 Drawing Sheets

DISC PLAYING APPARATUS TO WHICH DIGITAL DATA IS TRANSMITTED AT A PREDETERMINED TRANSMISSION RATE

BACKGROUND OF THE INVENTION

1. Field of the Invention

The present invention relates to a disc playing apparatus for playing a disc on which digital data to be transmitted at a predetermined transmission rate is recorded as a subcode, in addition to a coded information signal such as a digital audio signal.

2. Description of Background Information

A subcode carrying play control information for example is recorded on recording discs such as the digital audio disc called CD (compact disc), the disc called CD-V having an area in which only digital audio signal is recorded and an area in which a video signal is recorded in addition to the digital audio signal, and the video disc called LDD on which digital audio signal of CD format is recorded by a frequency multiplex process. The subcode is constituted by channels P, Q, R, S, T, U, V, and W in which channels P and Q are used as the control signal of the disc player. Specifically, the P channel bits of the subcode are used for distinguishing intervals between two music selections from areas in a music selection. A 0 is set to the P channel for the area in a music selection and a 1 is set for the interval between two music selections. The Q channel bits are used to indicate the music selection number of the music selection being played, and the time information such as the minutes, seconds, and the frame number which are measured from the beginning of the first one of the recorded music selections. The bits indicating the minutes, seconds and the frame number from the beginning of the first music selection are utilized as a block identification code for identifying each of the blocks designated as subcoding frame.

The channels R through W are vacant channels called user's bit, and various manners of utilization of these channels such as the recording of picture information are being considered. A standard of the recording format for recording picture information has been already proposed.

On the other hand, a standard called MIDI (Musical Instrument Digital Interface) has been developed so as to enable a music performance using a plurality of sound sources by combining a plurality of electronic musical instruments such as the music synthesizer or the electronic piano. A term "MIDI apparatus" is used for designating an electronic musical instrument which includes a hardware according to MIDI standard and has a function to transmit and receive a data format signal (referred to as MIDI signal hereinafter) as a musical instrument control signal of a defined form carrying musical information.

The MIDI signal is a serial data having a transfer rate of 31.25 Kbaud, and one byte data is constituted by 10 bits including 8-bit data and start and stop bits respectively having one bit.

In order to designate the sort of the transmitted data and the MIDI channel, at least one status byte and one or two data bytes leaded by the status byte are combined, forming a message as the musical information. Thus, one message is constituted by 1 through 3 bytes, and the transfer period of 320 through 960 $\mu$ sec is required.

As an example of such a message, the structure of the note-on message is shown in FIG. 1.

The note-on message in the status byte is a command corresponding to an operation of pressing a key of the keyboard, and used in a pair together with a note-off message which corresponds to an operation of releasing the key of the keyboard. The "note-number" in the data byte #1 is used to designate one of 128 stages which are allotted to the keys of the keyboard with its center positioned on the "central do" of the musical scale provided by the sound source. The "velocity" in data byte #2 is a number corresponding to the velocity of operation of the keyboard, and indicates the strength of the sound to be generated. Upon receipt of the note-on message, a MIDI apparatus generates a note of the designated musical scale at the designated strength, and stops the generation of the note when it receives the note-off message.

Not only picture information mentioned before, the MIDI signal can also be recorded in the user's bit of the subcode. By recording picture information and the MIDI signal in the user's bit, it is possible to control one or more additionally provided MIDI apparatuses in a predetermined order in addition to the reproduction of pictures and sounds obtained by the audio and video signals reproduced by the disc player. Therefore, various possibility of the utilization of this arrangement, such as the construction of an audio visual system including electronic musical instruments and capable of a program reproduction with full of presence, or the application to the production of educational softwares, are being considered.

An example of the construction of data format with the channels R through W of the subcode, i.e., the user's bits is shown in FIG. 2. As shown in this figure, one symbol is formed of six bits belonging to the channels R through W respectively. Ninety-eight symbols are treated as one block. Among these 98 symbols, 2 symbols are used as the synchronizing signal for subcoding frames, and 24 symbols obtained by dividing the remaining 96 symbols by 4 are treated as a minimum unit of the data, i.e. a Pack, and an image processing instruction or a MIDI signal group is constituted by this minimum data unit.

The symbol 0, i.e., the first one of the 24 symbols, represents the Mode. For instance, if the symbol 0 is "001001", it represents the TV graphics mode. On the other hand, if it is "111111" it indicates the MIDI signal mode. The symbol 1 following the symbol 0 is the "Instruction" indicating the sort of the instruction in the case of the picture processing instruction. The symbols 3 and 4 form the parity Q operating as an error correction code. The symbols from the symbol 4 through the symbol 19 form a data field, which carries the color information or the MIDI signal. The symbols 20 through 23 together form a parity P, that is an error correction code for protecting information in the pack.

As described above, picture information or the like is recorded on a disc in addition to the digital audio signal by using the user's bits of the subcode. Conventional disc players for playing such a disc have been configured to successively play the information recorded by the user's bit of the subcode in accordance with the progress of the play of the digital audio signal.

However, there are cases where it is desired to perform the so-called slow playback in which the playing speed of the information recorded by using the user's bit of the subcode is slower than the playing speed during the play of the digital audio signal or the so-called a fast (or multiplied-speed) playback in which the playing speed is higher than the playing speed during the play of the digital audio signal. With the conventional player, is has been impossible to perform a fast playback of the information recorded by using the user's bit of the subcode. Furthermore, it has been necessary to appropriately command a temporary interruption of the playing operation i.e. the so-called pause mode, by a manual operation, in order to perform the slow playback. Thus, complicated operations have been required in the case of conventional players.

OBJECT AND SUMMARY OF THE INVENTION

The present invention has been made in view of the points described above. An object of the present invention is to provide a disc playing apparatus in which the speed of playback of the subcode information can be set to a designated playback speed.

According to the present invention, the disc playing apparatus is configured to transmit each of digital data successively output from decoding means, which performs the decoding of the subcode read-out by the reading means and produces the digital data, at a predetermined transmission rate.

DETAILED DESCRIPTION OF THE PREFERRED EMBODIMENT

The embodiment of the present invention will be explained in detail with reference to FIGS. 3 through 8 of the accompanying drawings.

Figure 3:
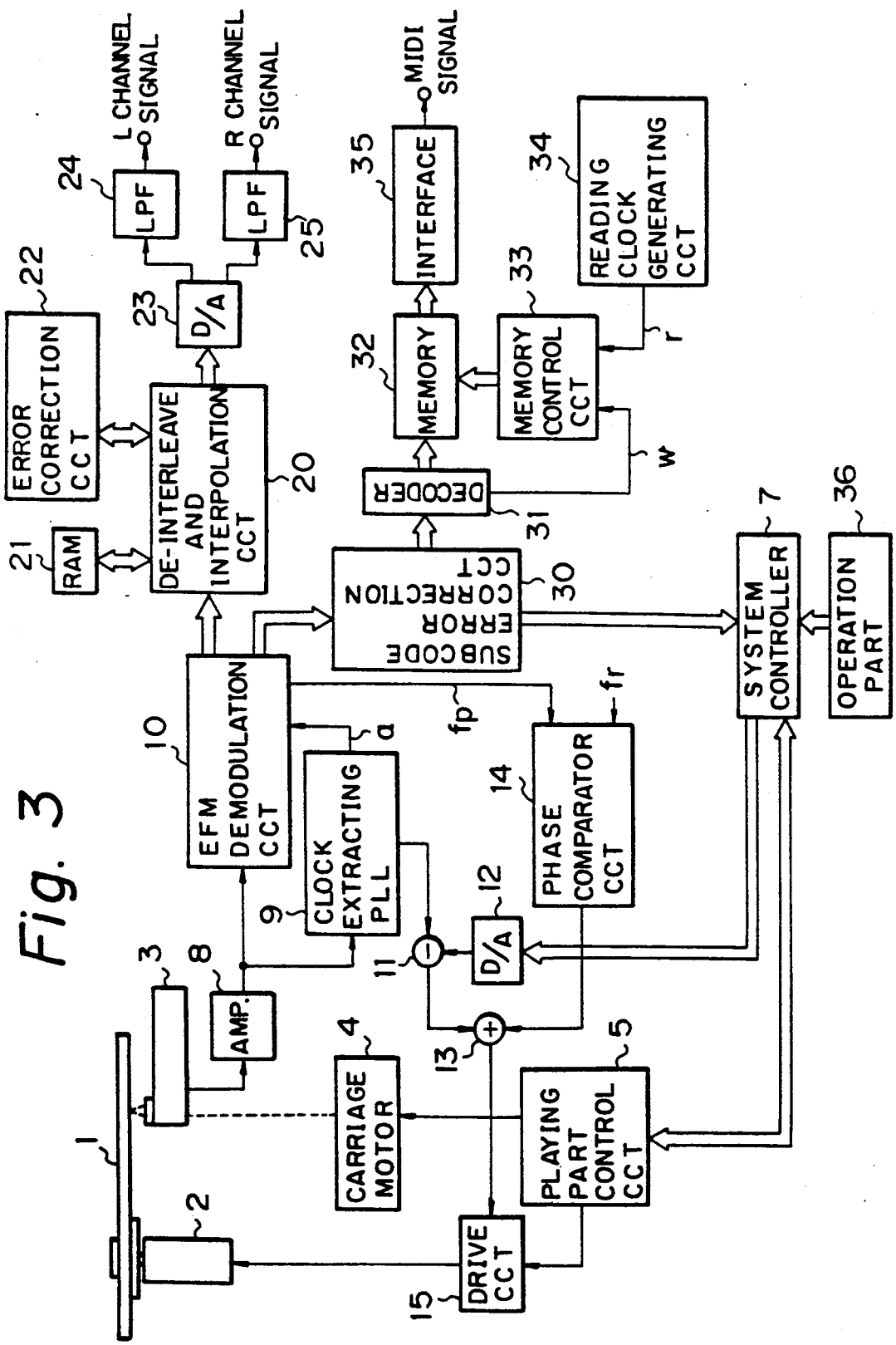
FIG. 3 is a block diagram showing an embodiment of the disc playing apparatus according to the present invention.

In FIG. 3, a disc 1 on which a plurality of music selections are recorded is rotated by a spindle motor 2. As the disc 1 rotates, a signal recorded on the disc is read by a pickup 3. The pickup 3 is carried on a carriage (not shown) which is driven by a carriage motor 4 and movable in a radial direction of the disc 1. With this arrangement, the position of an information reading point (information reading light spot) of the pickup 3 is arbitrarily determined in the radial direction of the disc 1. Furthermore, the player is provided with various servo systems such as the spindle servo system, focus servo system, tracking servo system, and carriage servo system. Since these servo systems themselves are well known, the explanation thereof will not be given in the specification.

The carriage motor 2 is driven by a carriage servo system, or a playing part control circuit 5. The playing part control circuit 5. In response to commands from a system controller 7, the playing part control circuit 5 performs various operations such as the driving of the spindle motor 2 and the carriage motor 4, and on-off control of the servo systems mentioned above, and a jump control.

The RF (radio frequency) signal output from the pickup 3 is supplied to an RF amplifier 8. The RF signal is amplified and shaped by this RF amplifier 8, so that an EFM signal is formed. The EFM signal output from the RF amplifier 8 is supplied to a clock extracting circuit 9 and an EFM demodulation circuit 10. The clock extracting circuit 9 is configured to form of a PLL circuit which locks to the clock signal contained in the EFM signal. A reproduced clock signal a extracted by the clock extracting circuit 9 is supplied to the EFM demodulation circuit 10. Output signal of an LPF (shown in FIG. 4) forming the PLL circuit in the clock extracting circuit 9 is supplied to a subtracting circuit 11, in which a signal corresponding to a difference between the output signal of the LPF and an output signal of a D/A converting circuit 12 is produced as a frequency error signal. To the D/A converting circuit 12, a velocity data is supplied from the system controller 7.

The frequency error signal output from the subtracting circuit 11 is supplied to a summing circuit 13 in which a phase comparison signal output from the phase comparator circuit 14 is added thereto, to form a spindle error signal. A reproduced frame sync signal fp output from the EFM demodulation circuit 10 and a reference frame sync signal fr output from a reference signal generating circuit consisting of a quartz oscillator and so on are supplied to the phase comparator circuit 14 in which a phase error signal corresponding to the phase difference between the sync signals is generated. The spindle error signal output from the summing circuit 13 is supplied to the spindle motor 2 through a drive circuit 15. With this arrangement, the rotational speed of the spindle motor 2 is controlled so that the level of the frequency error signal becomes equal to zero, and at the same time the phase difference between the reproduced frame sync signal fp and the reference frame sync signal becomes equal to zero. Since the output signal level of the LPF forming the PLL circuit in the clock extracting circuit 9 is corresponding to the frequency of the reproduced clock signal a, that is, the rotational speed of the disc 1 (spindle motor 2), the rotational speed of the disc 1 is determined on the basis of the velocity data supplied to the D/A converting circuit 12.

The EFM demodulation circuit 10 is configured to detect the frame sync signal in the EFM signal by means of the reproduced clock signal a, to produce the reproduced frame sync signal fp, and also to perform the demodulation process of the EFM signal, so that digital data including audio information of the left and right channels and the subcode are obtained. The digital data including audio information, output from this EFM demodulation circuit 10 is supplied to a de-interleave and interpolation circuit 20. The interleave and interpolation circuit 20 is configured to perform the following operations. In cooperation with the RAM 21, the de-interleave and interpolation circuit 20 puts the digital data in its original order, whose order has been changed by the interleave operation at the time of recording. Then the de-interleave and interpolation circuit 20 transmits the digital data to an error correction circuit 22, and performs the interpolation of erroneous data in the output data of the error correction circuit 22, by using the average value interpolation method for example, when a signal indicating the impossibility of the correction is issued from the error correction circuit 22. The error correction circuit 22 is configured to perform an error correction operation using the CIRC (Cross Interleave Reed Solomon Code) and to supply the digital data to de-interleave and interpolation circuit 20, and to generate the signal indicating the impossibility of the correction if the correction of error is not possible.

The output data of the de-interleave and error correction circuit 20 is supplied to a D/A (digital to analog) converting circuit 23. The D/A converting circuit 23 includes a de-multiplexer for separating the audio information of the left and right channels which has been multiplexed by the time division multiplex operation into information of each channel, so that audio signals of the left and right channels are reproduced. The audio signals of the left and right channels are supplied to LPFs (low-pass-filters) 24 and 25 where unnecessary components are removed, and supplied to audio output terminals subsequently.

The subcode output from the EFM demodulation circuit 10, on the other hand, is supplied to a subcode error correction circuit 30 where the error correction of the subcode is performed. The P and Q channels of the subcode are supplied to the system controller 7. The R through W channels of the subcode after passing through the error correction process by the subcode error correction circuit 30 are supplied a decoder 31.

The decoder 31 is configured such that, when the symbol 0 of the channels R through W of the subcode indicates a MIDI signal mode, it retrieves the subcode and successively outputs the MIDI data by one byte together with a writing clock w. The MIDI data output from the decoder 31 is supplied to a memory 32, and the writing clock w is supplied to a memory control circuit 33. To the memory control circuit 33, a reading clock r having a frequency corresponding to the transfer rate of the MIDI signal is supplied from a reading clock generating circuit 34. The memory control circuit 33 includes a writing address counter and a reading address counter which count up by the writing and reading clock respectively, and configured to perform the address control of the memory 32 by means of these two address counters. More specifically, each time the writing clock w is supplied, the memory control circuit 33 writes the data output from the decoder 31 at addresses designated by the output of the writing address counter. Each time the reading clock signal r is supplied, the memory control circuit 33 reads out the data stored in addresses designated by the output signal of the reading address counter. Furthermore, the memory control circuit 33 is structured to prevent the reading address counter from counting up when the output of the writing address counter coincides with the output of the reading address counter.

The data read-out from the memory 32 is supplied to an interface consisting of a transmitter and a line driver, wherein a serial MIDI signal is produced. This MIDI signal is supplied, through a MIDI-OUT terminal, to the MIDI-IN terminal of MIDI apparatuses (not shown).

The system controller 7 is made up of a microcomputer including a processor, ROMs, RAMs, and timers, and so on. In response to various commands corresponding to key operations supplied from the operation part 36, the system controller 7 executes arithmetic operations on the basis of data or programs stored in the ROM, RAM and the like, and subsequently supplies instruction signals for the play, search, jump operation and so on, to the playing part control circuit 5.

Figure 4:
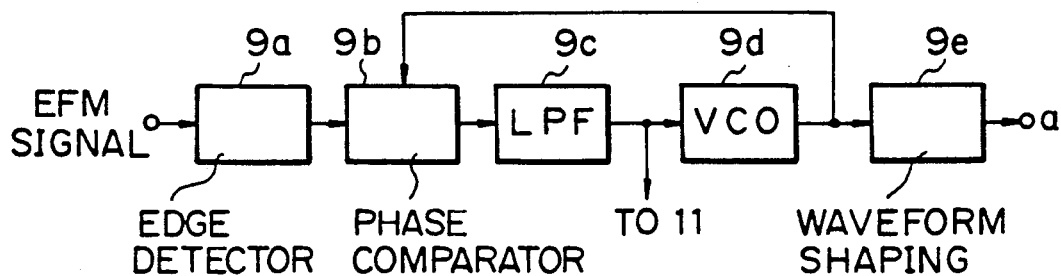
FIG. 4 is a block diagram showing the circuit construction of the clock extracting circuit 9 in the apparatus shown in FIG. 3.

FIG. 4 is a block diagram specifically showing the circuit construction of the clock extracting circuit 9. The EFM signal output from the RF amplifier 8 is supplied to an edge detector 9a. The edge detector 9a is configured to generate an edge pulse having a pulse width equal to a half period of the normal clock signal in synchronism with the timing of the level transition of the EFM signal. The edge pulse from the edge detector 9a is supplied to one of two input terminals of a phase comparator 9b, in which it is compared in phase with the output signal of a VCO 9d (Voltage Controlled Oscillator). The phase difference signal produced from this phase comparator 9b is smoothed out by an LPF 9c, so that a control signal of the VCO 9d is derived. The output signal of the VCO 9d is converted to a pulse signal by a waveform shaping circuit 9e, and in turn output as the reproduced clock signal a.

Figure 5:
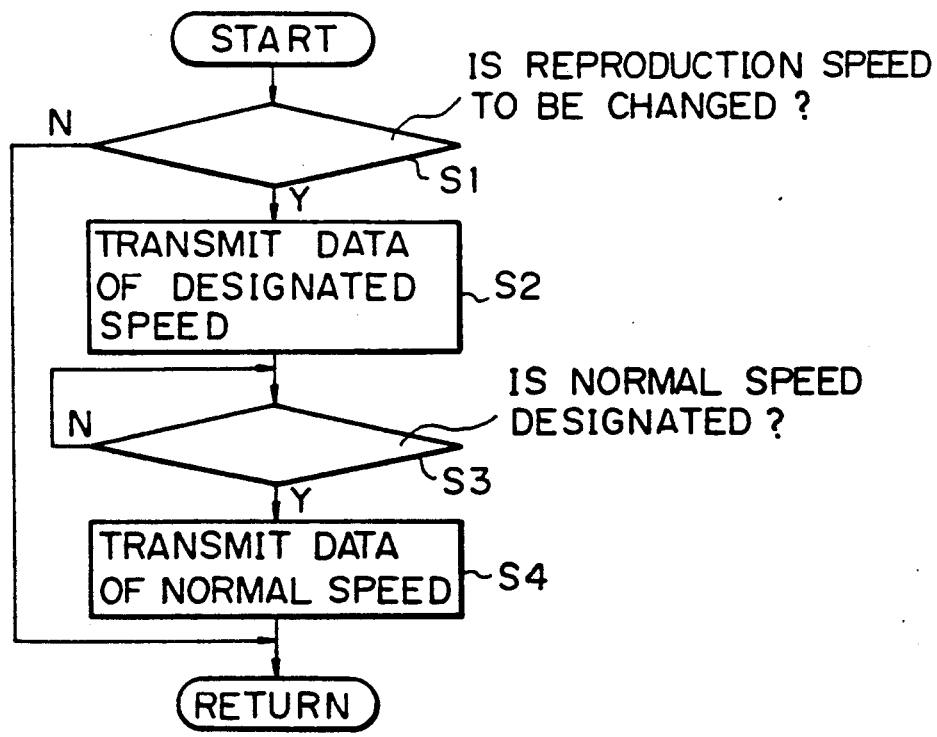
FIG. 5 is a flowchart showing the operation of the processor in the apparatus shown in FIG. 3.

The operation of the processor of the system controller 7 in the apparatus having the construction described above will be explained with reference to the flowchart of FIG. 5.

In response to an interruption by the timer and the like during the execution of the main routine, the processor proceeds to step S1 in which the processor judges whether or not a change of the reproduction speed is commanded. If it is judged in step S1 that the change of the reproduction speed is not commanded, the processor restarts the execution of the routine which was being executed immediately before proceeding to step S1. On the other hand, if it is judged in step S1 that the change of the reproduction speed is commanded, the processor transmits a data corresponding to the designated reproduction speed to the D/A converting circuit 12 (step S2). After the execution of the step S2, the processor repeatedly performs the judgement as to whether or not a normal reproduction speed is commanded (step S3). Only when it is judged that the normal reproduction speed is designated, the processor transmits a predetermined data corresponding to the normal reproduction speed to the D/A converting circuit 12 (step S4), and restart the routine which was being executed immediately before proceeding to step S1.

In the operation described above, when a reproduction speed different from the normal reproduction speed is designated, the data corresponding to the designated reproduction speed is transmitted to the D/A converting circuit 12 through steps S1 and S2. As a result, a signal having a level corresponding to the frequency of the reproduced clock signal a extracted from the EFM signal read-out by the pickup 3 is output from the LPF 9c in the clock extracting circuit 9. Since the rotational speed of the spindle motor 2 is controller so that the level of the frequency error signal corresponding to the difference between the output signal of the LPF 9c and the output signal of the D/A converting circuit 12 becomes equal to zero, the rotational speed of the disc 1 becomes equal to a rotational speed corresponding to the designated reproduction speed.

Figure 6:
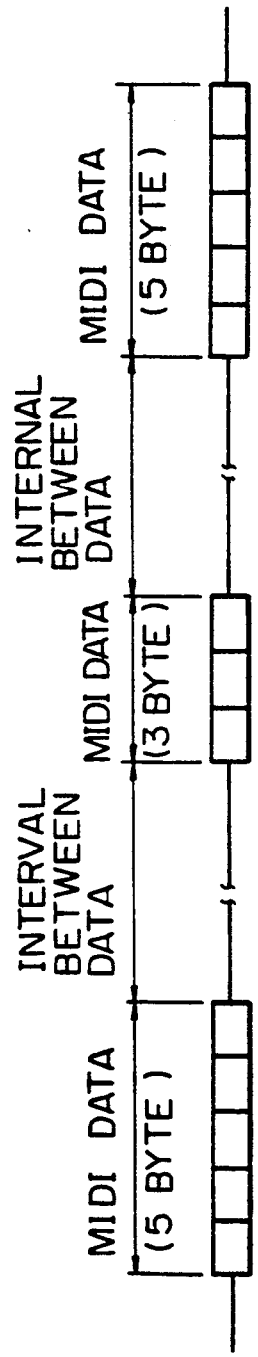
FIG. 6 is a diagram showing the function of the apparatus shown in FIG. 3.

Under this condition, the transfer rate of the MIDI data which is supplied from the decoder 31 to the memory 32 becomes equal to a speed corresponding to the designated reproduction speed. Since the speed at which data is read-out from the memory 32 is determined by the reading clock signal r having the frequency corresponding to the transfer rate of the MIDI signal, the MIDI signal output from the interface 35 is such a signal as shown in FIG. 6, in which only the interval between data is varied in response to the designated reproduction speed. As a result, the playing speed of the electronic musical instruments controlled by the MIDI data becomes equal to a speed corresponding to the designated speed of reproduction.

Figure 7:
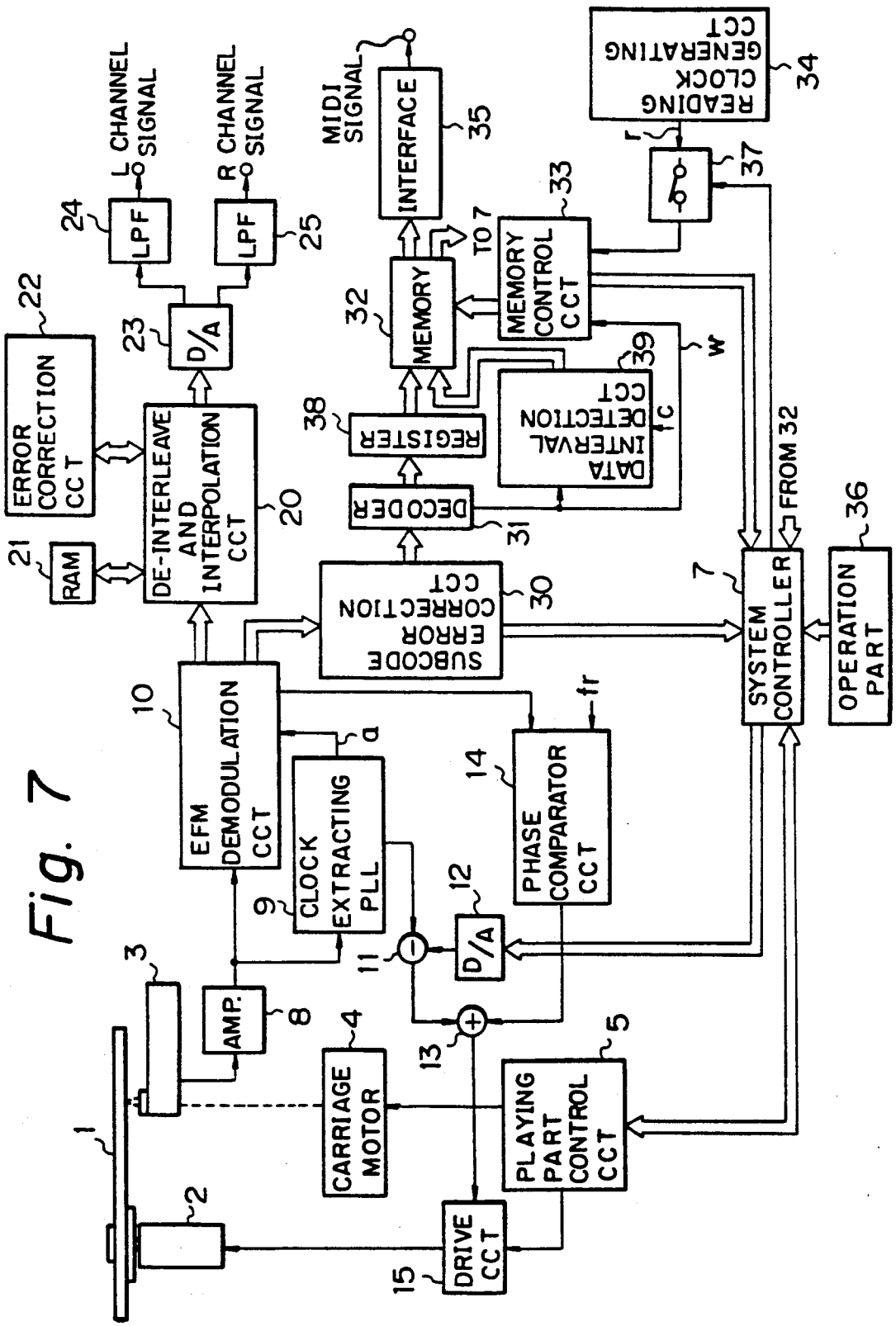
FIG. 7 is a block diagram showing another embodiment of the disc playing apparatus according to the present invention.

FIG. 7 is a block diagram showing another embodiment of the disc playing apparatus according to the present invention. The arrangement of the disc 1, and various parts of the apparatus which will be described below is the same as in the apparatus shown in FIG. 3. The above-mentioned parts of the apparatus are: the spindle motor 2, pickup 3, carriage motor 4, playing part control circuit 5 system controller 7, RF amplifier 8, clock extracting circuit 9, EFM demodulation circuit 10, subtracting circuit 11, D/A converting circuits 12 and 23, summing circuit 13, phase comparator circuit 14, driving circuit 15, de-interleave and interpolating circuit 20, RAM 21, error correcting circuit 22, LPFs 24 and 25, subcode error correcting circuit 30, decoder 31, memory 32, memory control circuit 33, interface 35 and operation part 36.

However, in this embodiment, the output data of the decoder 31 is supplied top a register 38. The writing clock signal w is supplied to a clock input terminal of the register 38. The output signal of the register 38 is supplied to the memory 32. By the register 38, the output signal of the decoder 31 is delayed for a time span corresponding to the period of the writing clock signal, and in turn supplied to the memory 32.

The writing clock signal w is also supplied to a data interval detection circuit 39. The data interval detection circuit 39 is, for example, made up of a counter which counts-up a system clock c generated in the system controller 7, and is reset by the writing clock w, and a latch circuit which holds the output of the counter immediately before the reset in response to edges of the writing clock w. The output signal of the latch circuit in the data interval detection circuit 39 is supplied to the memory 32 as an interval data indicative of the interval between the data held in the register 38 and the data to be output from the decoder 31 and held in the register 38 next time.

The memory 32 is constructed to store, at each address, the MIDI data from the register 38 together with the interval data from the data interval detection circuit 39. The interval data read-out from each address of the memory 32 is supplied to the system controller 7.

Also a data in the memory control circuit 33 for controlling the memory 32 representing the difference between the output data of the writing and reading address counters is supplied to the system controller 7.

The output signal of the reading clock generating circuit 34 is supplied to the memory control circuit 33 through a switch 37. The on-off control of the switch 37 is performed by the system controller 7.

Figure 8:
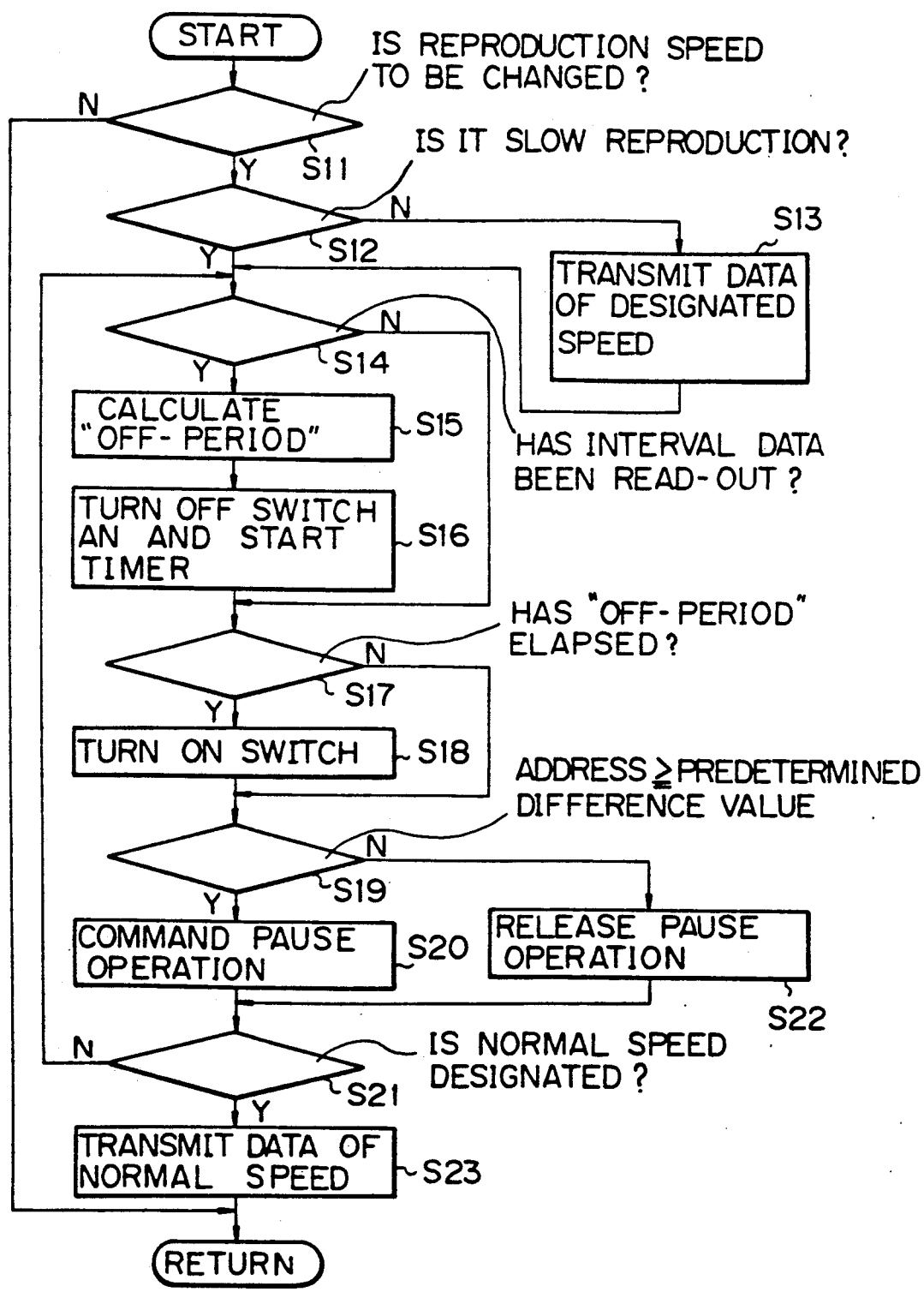
FIG. 8 is a flowchart showing the operation of the processor in the apparatus shown in FIG. 7.

The operation of the processor in the system controller 7 of the arrangement described above will be explained with reference to the flowchart shown in FIG. 8.

In response to an interruption by the timer and the like during the execution of the main routine, the processor proceeds to step S11 in which the processor judges whether or not the command for changing the reproduction speed is issued. If it is judged in step S11 that the change of the reproduction speed is commanded, the processor then judges whether or not a slow reproduction is designated (step S12). If it is judged in step S12 that the slow reproduction is not designated, the processor transmits to the D/A converting circuit 12 a data corresponding to the designated reproduction speed (step S13). Then the processor judges whether or not the interval data is read-out from the memory 32 (step S14). If it is judged in step S14 that the interval data is read-out, the processor then calculates a time duration corresponding to the interval represented by the interval data and the designated reproduction speed (step S15). In step S15, if a double-speed reproduction is commanded, for example, the processor produces a data a time duration which is obtained by dividing the interval represented by the interval data by two. Similarly, if a ½ speed reproduction (slow reproduction) is commanded, the processor produces a data of a time duration which is obtained by doubling the interval represented by the interval data.

After the execution of the operation of step S15, the processor turns the switch 37 off and starts the timer (step S16). By using the period timed this timer, the processor judges whether or not the time duration calculated in step S15 has elapsed (step S17). If it is judged in step S17 that the calculated time duration has elapsed, the processor turns the switch 37 on (step S18). Then, the processor judges whether or not the difference between the output data of the writing and reading address counters has become greater than a predetermined value by using the output data of the memory control circuit 33 (step S19). If it is judged in step S17 that the calculated time duration has not elapsed, the processor immediately proceeds to step S19. If it is judged in step S14 that the interval data has not been read-out, the processor immediately proceeds to step S17.

If it is judged in step S19 that the difference between the output data of two counters has become greater than the predetermined value, the processor issues a pause command to the playing part control circuit 5 (step S20). Then, the processor judges whether or not the normal reproduction speed is designated (step S21). If it is judged in step S19 that the difference between the output data of two counters has not become greater than the predetermined value, the processor issues the pause command (step S22), and proceeds to step S21.

If it is judged in step S21 that the normal reproduction speed is not commanded, the processor again proceeds to step S14. If it is judged in step that the normal reproduction speed is commanded, the processor transmits the predetermined data corresponding to the normal reproduction speed to the D/A converting circuit 12 (step S23). Then, the processor restart the execution of the routine which was being executed immediately before proceeding to step S11.

Through the operations of steps S12 and S13 in the procedure described above, the data corresponding to the designated speed is transmitted to the D/A converting circuit if a multiplied speed reproduction is designated. In this case, the rotational speed of the disc 1 becomes larger than the speed in the case of the normal reproduction. In the case of the slow reproduction, the rotational speed of the disc 1 remains unchanged, and is the same as the speed in the normal reproduction operation.

Figure 1:
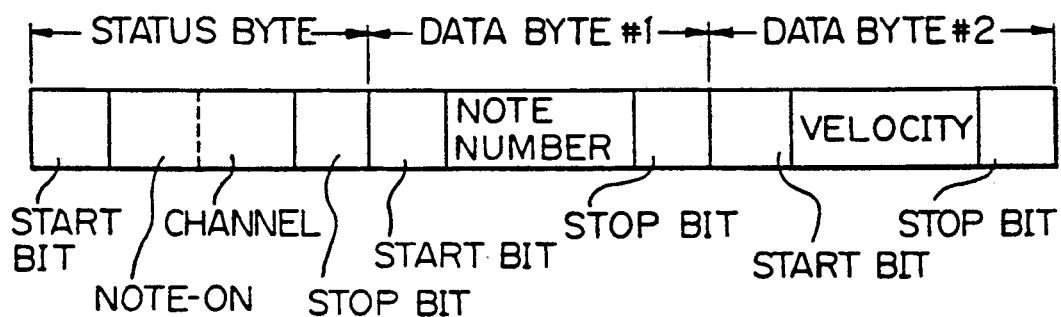
FIG. 1 is a diagram showing an example of the structure of MIDI message.
Figure 2:
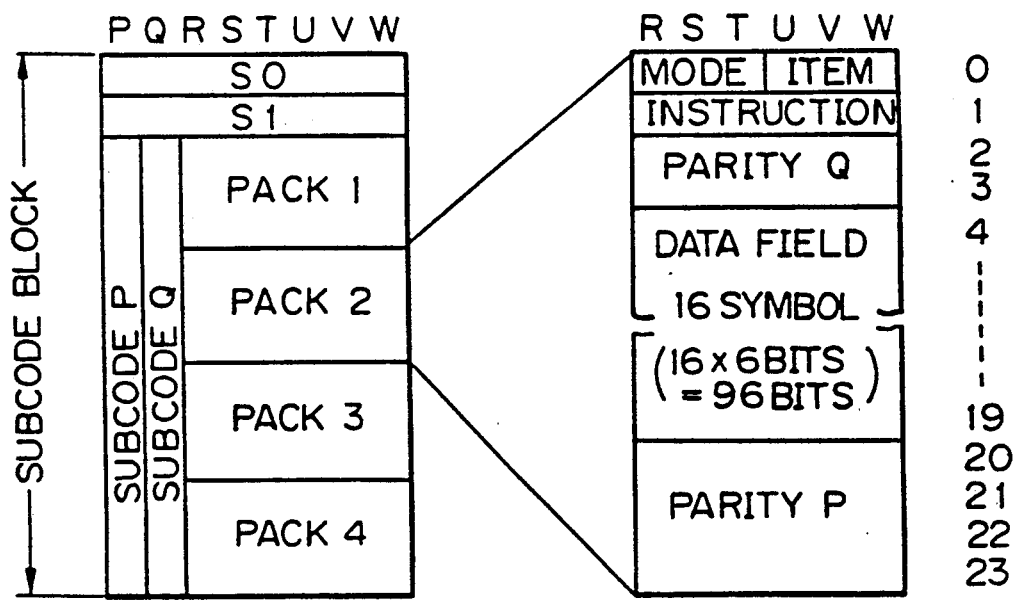
FIG. 2 is a diagram showing an example of the structure of subcode data.

Subsequently, through the operations in steps S14 to S18, the switch 37 is turned off for the time span which is obtained by adjusting the interval represented by the interval data in response to the designated reproduction speed. During this time span the reading clock r is not supplied to the memory control circuit 33 so that the MIDI data is not read-out. As a result, the interval between MIDI data is determined in response to the designated reproduction speed. In this way, the playing speed of the electronic musical instruments controlled by the MIDI data becomes equal to a speed corresponding to the designated reproduction speed, as in the case of the apparatus of FIG. 1.

In the case of the slow reproduction, the MIDI data is in turn written in the memory 32. The reading of the memory 32, however, is effected at a speed lower than the speed of writing. Therefore, if the difference between the writing and reading address data become greater than a predetermined value, the writing address counter would over-flow, to allot the writing address from the first address of the memory 32. In such an event, new MIDI data would be written into addresses from which the MIDI data is not yet read-out, causing a drop-out of data. According to the present invention, the operations of steps S19 to S21 are provided to avoid the above-described inconvenience. When the difference between the output data of the address counters becomes greater than the predetermined value, a pause operation is performed by which the information reading point of the pickup 3 is moved by one track-to-track spacing every revolution of the disc 1. Thus, the decoder 31 will not output new data, so that drop-out of data is prevented.

In the embodiment shown in FIG. 7, the rotational speed of the disc during the slow reproduction is the same as the speed in the normal reproduction, and the rotational speed of the disc is changed only during the multiplied speed reproduction. It is to be noted, however, if we assume that the rotational speed of the disc is set at a ten-times fast speed for example, the reproduction speed can be selected at any speed slower than the ten-times fast speed by adjusting the interval between data by the control of the duration in which the switch 37 is turned off. Therefore, in the apparatus shown in FIG. 7 the rotational speed of the disc 1 can be determined to be either of two speeds, i.e. the normal reproduction speed and a predetermined multiplied reproduction speed.

As specifically described in the foregoing, the disc playing apparatus according to the present invention is configured such that each of digital data successively output from a decoding means, which decodes the subcode read-out by a reading means and produces the digital data, is transmitted at a predetermined transmission rate. Therefore, in the disc playing apparatus according to the present invention, the interval between each of digital data is varied in response to the designated reproduction speed, and each of the digital data is transmitted at the predetermined transmission rate. Thus, the reproduction speed of digital data, which is recorded as the subcode and its transmission rate is normalized, can be set at a designated speed.

What is claimed is:

1. A disc playing apparatus for playing a disc on which digital data which is to be transmitted at a predetermined transmission rate is recorded as a subcode, in addition to a coded information signal, the apparatus comprising:
   disc driving means for rotating said disc at a rotational speed corresponding to a designated reproduction speed;
   reading means for reading said coded information signal and said subcode from said disc;
   decoding means for decoding said subcode readout by said reading means and successively outputting pieces of digital data at a rate corresponding to said designated reproduction speed; and
   signal transmission means for receiving each piece of said digital data successively outputted by said decoding means at the rate corresponding to said designated reproduction speed, and transmitting each piece of said digital data at said predetermined transmission rate.

2. A disc playing apparatus for playing a disc on which digital data which is to be transmitted at a predetermined transmission rate is recorded as a subcode in addition to a coded information signal, the apparatus comprising;
   disc driving means;
   reading means for reading said coded information signal and said subcode from said disc;
   decoding means for decoding said subcode read-out by said reading means and producing digital data; and
   signal transmission means which comprises:
     interval detection means for detecting the interval between pieces of said digital data successively outputted from said decoding means and producing interval data representing said interval;
     memory means for storing said digital data supplied from said decoding means;
     memory control means for successively writing said digital data output from said decoding means and in turn reading-out said digital data written in said memory means at intervals obtained by adjusting the interval represented by said interval data in response to a designated reproduction speed; and
     means for transmitting said digital data readout from said memory means successively by one bit at said predetermined transmission rate.

3. An apparatus as claimed in claim 2, further comprising play control means for jumping an information reading point of said reading means by a predetermined number of track spacings each time when a difference between writing and reading addresses of said memory means becomes larger than a predetermined value.

* * * * *